US008190416B2

(12) United States Patent
Mead

(10) Patent No.: US 8,190,416 B2
(45) Date of Patent: May 29, 2012

(54) COMPUTER NETWORK MANAGEMENT

(75) Inventor: Michael Mead, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1218 days.

(21) Appl. No.: 11/873,636

(22) Filed: Oct. 17, 2007

(65) Prior Publication Data

US 2008/0103749 A1 May 1, 2008

(30) Foreign Application Priority Data

Oct. 26, 2006 (EP) .................................... 06122996

(51) Int. Cl.
*G06F 17/50* (2006.01)
(52) U.S. Cl. ........................................................ 703/13
(58) Field of Classification Search ...................... 703/13
See application file for complete search history.

(56) References Cited

U.S. PATENT DOCUMENTS

| | | | | | |
|---|---|---|---|---|---|
| 5,185,860 | A | * | 2/1993 | Wu | 709/224 |
| 5,276,789 | A | * | 1/1994 | Besaw et al. | 345/440 |
| 5,862,386 | A | * | 1/1999 | Joseph et al. | 717/170 |
| 6,286,047 | B1 | * | 9/2001 | Ramanathan et al. | 709/224 |
| 6,411,997 | B1 | * | 6/2002 | Dawes et al. | 709/224 |
| 6,748,429 | B1 | * | 6/2004 | Talluri et al. | 709/221 |
| 7,519,711 | B2 | * | 4/2009 | Mohindra et al. | 709/226 |
| 2003/0088857 | A1 | * | 5/2003 | Balva et al. | 717/137 |
| 2003/0149756 | A1 | * | 8/2003 | Grieve et al. | 709/223 |
| 2004/0216089 | A1 | * | 10/2004 | Kaler et al. | 717/120 |
| 2005/0166115 | A1 | | 7/2005 | Daume et al. | |
| 2006/0218145 | A1 | * | 9/2006 | Butcher et al. | 707/6 |
| 2007/0113186 | A1 | * | 5/2007 | Coles et al. | 715/735 |
| 2007/0143752 | A1 | * | 6/2007 | Clemm et al. | 717/178 |
| 2007/0282470 | A1 | * | 12/2007 | Hernandez et al. | 700/90 |
| 2009/0083400 | A1 | * | 3/2009 | Draca et al. | 709/220 |

FOREIGN PATENT DOCUMENTS

EP     1 335 557 A1     8/2003

OTHER PUBLICATIONS

Patrick M. Ritto, "Parallel flow graph matching for automated program recognition", 1998, MIT Artificial Intelligence Laboratory, pp. 1-16.*
Yuri Breitbart et al., "Topology discovery in heterogeneous IP networks: The NetInventory system", 2004, IEEE/ACM Transactions on Networking, vol. 12, No. 3, pp. 401-414.*
Thomas Kunz et al., "Using automatic process clustering for design recovery and distributed debugging", 1995, IEEE Transactions on Software Engineering, vol. 21, No. 6, pp. 515-523.*
Nabor C. Mendonca et al., "An approach for recovering distributed system architectures", 2001, Automated Software Engineering, vol. 8, pp. 311-354.*
P. Pietikainen et al., "Communication Pattern Extraction: Inferring causal relationships in complex systems", 2005, downloaded from citeseer.ist.psu.edu, eight unnumbered pages.*

(Continued)

*Primary Examiner* — Paul Rodriguez
*Assistant Examiner* — Russ Guill

(57) ABSTRACT

According to one embodiment of the present invention, there is provided a method of identifying components of a computer infrastructure, comprising building a graph-based model of at least a part of the computer infrastructure, determining the presence within the built graph of a predetermined sub-graph, and where it is so determined identifying the sub-graph within the built graph.

16 Claims, 4 Drawing Sheets

OTHER PUBLICATIONS

Sylvain Halle et al., "Automated validation of service configuration on network devices", 2004, Lecture Notes in Computer Science 3271, Springer, pp. 176-188.*
Sylvain Halle et al., "Self-configuration of network devices with configuration logic", 2006, Lecture Notes in Computer Science 4195, Springer, pp. 36-49.*
Sylvain Halle et al., "A formal validation model for Netconf protocol", 2004, Lecture Notes in Computer Science 3278, Springer, pp. 147-158.*
Rudy Deca et al., "Configuration model for network management", 2005, IFIP International Federation for Information Processing, vol. 165/2005, pp. 3-14.*
Gelbord, B.; "Graphical Techniques in Intrusion Detection Systems", Informatoin Networking, 2001. Proceedings, 15th Intern'l Conf. Jan. 31 to Feb. 2, 2001, pp. 253-258, XP010534280.
Eppstein, D., "Subgraph Isomorphism in Planar Graphs and Related Problems", Internet Citation [Online] Nov. 1999, XP002201677, URL:http://www.cs.brown.edu/publications/jgaa/.
Cheung S., et al., "The Design of GrIDS: A Graph-Based Intrusion Detection System", Jan. 26, 1999, XP002201678, URL:http://seclab.cs.ucdavis.edu/grids/grids/pdf.

* cited by examiner

COMPUTER NETWORK MANAGEMENT

FIELD OF THE INVENTION

The present invention relates generally to the field of computer infrastructures, and more particularly, although not exclusively, to the management of computer networks.

BACKGROUND OF THE INVENTION

It is generally appreciated that enterprise computing infrastructures are too large and complex to be managed efficiently by humans alone. Increasingly IT managers are using management software, such as the suite of Hewlett-Packard OpenView software, to help manage such computing environments.

Such management software may be used, for example, to help IT managers diagnose problems and assess the impact of change or failure of components in the computing environment.

However, in order for such management software to be effective it is generally necessary to have an accurate representation or model of the computing environment in a suitable form.

Enterprise computing environments are typically highly complex in nature involving large numbers of computing devices of different kinds ranging from desktop computers, servers, routers, and the like. The computing devices are typically connected to one or more networks, and each computing device may have a different set of applications installed or executing thereon. Applications may also be distributed across one or more computing devices leading to complex inter-dependencies between both computing devices and software applications.

Enterprise computer environments are also typically highly dynamic with software frequently being installed, modified, updated, removed, etc. However, often IT managers are not informed when changes to the computing environment are made making it difficult for an overall representation of the computing environment to be maintained, and without an accurate model managing the computing environment becomes difficult. Furthermore, manually maintaining a configuration management database in such environments is unviable.

There are numerous automated techniques that may be deployed to build up and maintain a representation, such as a model, of a computing environment. Although manual methods may be used it is typically impractical to do so due to the large size, complexity and dynamic nature of all but the simplest computing environments.

Commonly used techniques include probing, agents and packet capture.

Probing involves attempting to identify the presence of a specific software application on a host computer by attempting to contact a host computing device on a reserved or well known port and by comparing any response received with a list of known responses. However, probing itself can only be used to identify the presence of known elements of an application, such as a HTTP server, a telnet server and the like.

Packet capture involves 'sniffing' data packets, typically at the Internet protocol (IP) layer, by software or hardware elements that capture packets in a network. The captured packets are analysed to try and determine to which host computing device and software application they relate. However, such techniques are typically unable to identify anything more than IP address and port number end points and thus do not directly enable an application to be identified. This is especially the case when packet encryption is used as the contents of the packets are encrypted.

Software agents are applications that are installed on a host computing device and used to query the operating system of the computing device to determine information about the applications that are active on host computing device. The information gathered, which for example may include Internet protocol (IP) addresses, process identifiers, network ports in use, etc. for each application may then be reported to a centralised repository. Once the gathered information has been obtained analysis of the information may be performed to attempt to identify at least some software applications in the network.

However, current analysis techniques are somewhat unsophisticated and rely generally on basic pattern matching techniques to match known combinations of process ID, IP address, port number, etc., obtained from known applications to those discovered in a computing infrastructure.

Accordingly, one aim of the present invention is to overcome, or at least to alleviate, at least some of the above-mentioned problems.

SUMMARY OF THE INVENTION

According to a first aspect of the present invention, there is provided a method of identifying components of a computer infrastructure. The method comprises building a graph-based model of at least a part of the computer infrastructure, determining the presence within the built graph of a predetermined sub-graph; and where it is so determined identifying the sub-graph within the built graph.

In some examples, the method further comprises identifying as unidentified applications any part of the built graph not identified as a predetermined sub-graph. In some such examples, the method further comprises removing any unidentified applications from the computer infrastructure.

According to a second aspect of the present invention, there is provided apparatus for identifying components in a computer infrastructure operable in accordance with any of the above-mentioned method steps.

BRIEF DESCRIPTION OF THE DRAWINGS

Embodiments of the present invention will now be described, by way of non-limiting example, in which.

DETAILED DESCRIPTION OF THE PREFERRED EMBODIMENTS

Figure 1:
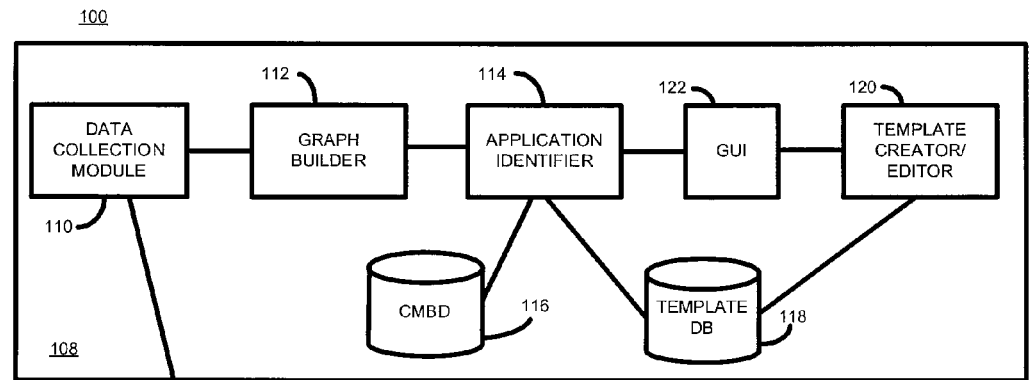
FIG. 1 is a block diagram of a computer system 100 according to an embodiment of the present invention.
Figure 1:
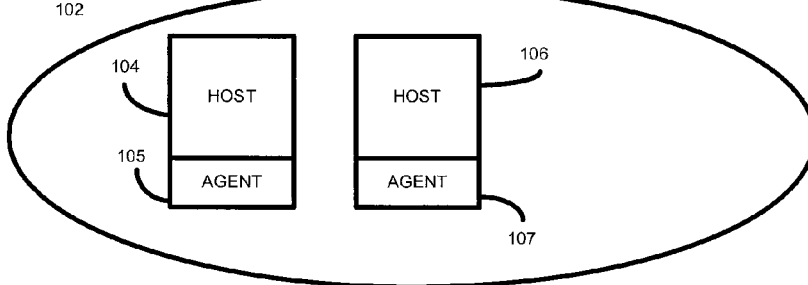

Referring now to FIG. 1, there is shown a block diagram of a computer system 100 according to an embodiment of the present invention.

The computer system 100 comprises a computer network 102 that is managed by a management module 108. The managed network 102 comprises multiple computer hosts that are suitable for enabling communications over the network. For clarity of explanation only two nodes 104 and 106 are shown, although those skilled in the art will appreciate that many more nodes may be present. The hosts 104 and 106 may be a computing device, such as a computer server, laptop computer, network router, switch, or any other network addressable devices. Where the hosts 104 and 106 are appropriate computing devices each host 104 and 106 runs an appropriate operating system (not shown) and may execute one or more software applications (not shown). Each software application may comprise one or more operating system processes (not shown). The software applications on each host may communicate with each other via the computer network 102 in a generally known manner.

Each host 104 and 106 also runs an agent software application, 105 and 107 respectively. The agent software applications 105 and 107 periodically obtain details of operating system processes running on each host and send this information to a data collection module 110 of the management module 108.

The agent software applications 105 and 107 may obtain details of the operating system processes running on their respective hosts in any suitable manner. For example, if the hosts are running the UNIX operating system, tools such as ps and lsof, which are well known tools may be used.

An example output of the lsof tool being run on the host 104 is shown below. Note that for clarity the examples below are shown in an easily-readable form and show only a single process running on each host. Those skilled in the art, however, will appreciate, that typically many processes may be running on each host, and that the output of such tools may use numerical representations of machine names, Internet protocol (IP) addresses etc.

| Command | PID | USER | FD | TYPE | DEVICE | SIZE | NODE | NAME |
|---|---|---|---|---|---|---|---|---|
| sshd | 3737 | Root | 3u | IPv4 | 7860 | | TCP | HostA:ssh->HostB:1920 |

This indicates that HostA, 104, is running a secure shell daemon (sshd) and has established a TCP connection to a process on computing device HostB, 106, using port 1920 on that host. It is also known that secure shell daemons listen on the well-known ssh port (port 22), as defined by the Internet Assigned Numbers Authority (IANA).

An example output of the lsof tool being run on the host 106 may show:

| Command | PID | USER | FD | TYPE | DEVICE | SIZE | NODE | NAME |
|---|---|---|---|---|---|---|---|---|
| ssh | 17354 | mikem | 3u | IPv4 | 7860 | | TCP | HostB:1920->HostA:22 |

This indicates that HostB, 106, is running a secure shell process (ssh) owned by user mikem. It also indicates that a TCP connection is established with HostA, 104, using port 22.

Those skilled in the art will appreciate that other information gathering techniques could equally be used, either in place of or in addition to the agent software applications. Such other techniques include, for example, probing, packet sniffing, and the like. Such techniques may be used to identify any determinable information such as IP address, port number, port status (listening, connected, etc.), machine address, etc.

Embodiments of the present invention are based, at least partly, on a number of realisations. First, the information gathered by the data collection module 110 may be used to construct a graph of the managed network 102, the graph having graph nodes and graph edges. Graph nodes, for example, may be services, processes or other identifiable resources. Graph edges, for example, may represent arbitrary relationships, such as communication paths, resources, etc. Second, a known software application can be modelled as a graph, hereinafter referred to as a template graph, using the same kind of information, and that the resulting template graph is substantially unique and may be used as a substantially unique fingerprint. Third, known applications within a managed network can be identified by matching template graphs in the network graph. Furthermore, well known and powerful sub-graph isomorphism techniques can be used to perform the template graph matching, resulting in fast and efficient identification of sub-graphs within a graph.

Figure 8:
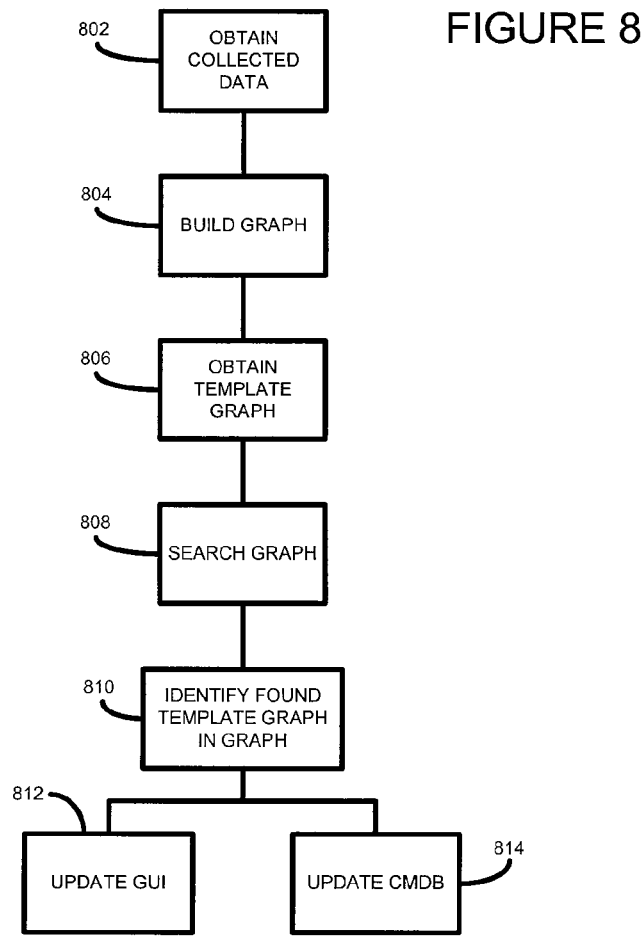
FIG. 8 is a flow diagram showing example processing steps according to an embodiment of the present invention.

Further details are now given with continuing reference to FIG. 1 and additional reference to FIG. 8, which is a flow diagram outlining example processing steps that may be taken in accordance with an embodiment of the present invention.

Once the data collection module 110 has received information (step 802) about each host in the managed network 102 a graph building module 112 is invoked to build (step 804) an in-memory graph composed of graph nodes and graph edges. As previously mentioned, graph nodes may, for example, be services, processes or other identifiable resources and graph edges may represent arbitrary relationships, such as communication paths.

Figure 2:
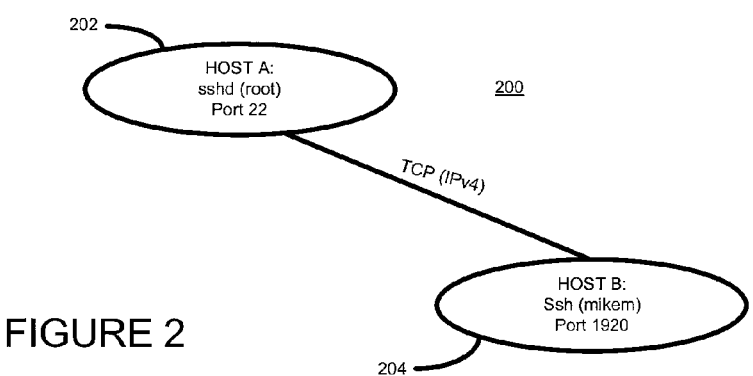
FIG. 2 is a graph diagram showing a simple network graph 200 according to an embodiment of the present invention.

The graph building module 112 correlates the information obtained by the data collection module 110 and generates an in-memory network graph. FIG. 2 shows a visual representation of a simple network graph 200 built using the information collected by the data collection module 110 as described above.

Figure 3:
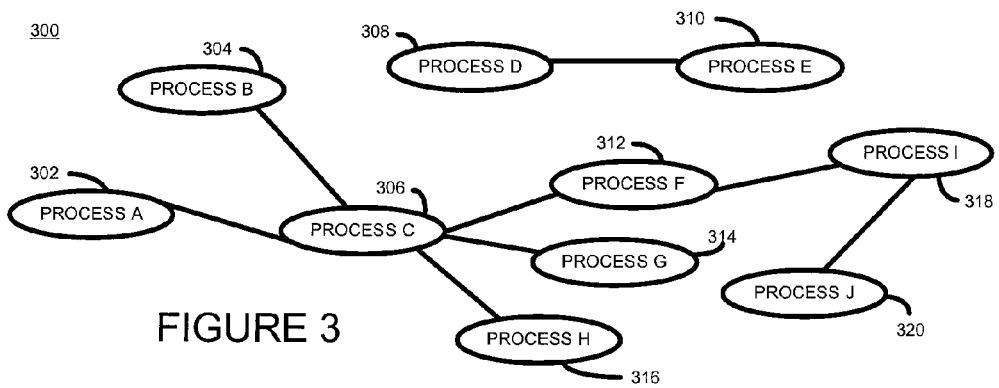
FIG. 3 is a graph diagram of an example graph of a managed network according to an embodiment of the present invention.

FIG. 3 is further example showing a more complex network graph 300 built by the graph building module 112. As can be seen, in the example network graph many different processes and inter-relationships between those processes have been collected by the data collection module 110. However, for clarity only a process identifier is shown for each process in FIG. 3.

Figure 4:
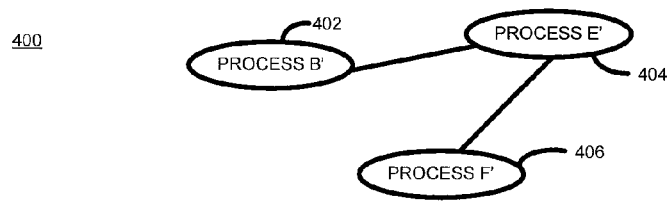
FIG. 4 is a graph diagram of an example template graph according to an embodiment of the present invention.

Once a network graph has been built, applications within the managed network 102 can be identified by using an application identifier module 114. The application identifier module 114 retrieves (step 806) a predefined application template graph from a template database 118. An example of such a template graph 400 is shown in FIG. 4. The application template graphs are graphs built using similar information to that stored by the data collection module 110. Where the information is different, a reformatting or filtering of a template graph or network graph may be carried so as to enable a suitable sub-graph matching technique to be used. A template graph may additionally be manually edited, by a template creator/editor module 120, to ensure that the graph relates only to the application in question. Alternatively, graphs may be manually built using the template creator/editor module 120 using, for instance, any suitable user interface.

To determine the presence of a given application in the managed network 102 the network graph is searched (step 808) for sub-graphs that match the application template graph. This technique is generally known as sub-graph isomorphism and there exist many well known techniques and algorithms for perform the searching and matching, as described, for example, in the paper "An Improved Algorithm for Matching Large Graphs" L. P. Cordelle, P. Foggia, C. Sansone, M Vento, Diparimento di Informatica e Sistemistica, Universita degli Studi di Napoli "Federico II".

If the template graph 400 is found in the network graph 300 the graph elements may be collectively identified (step 810) as relating to the identified application.

Figure 5:
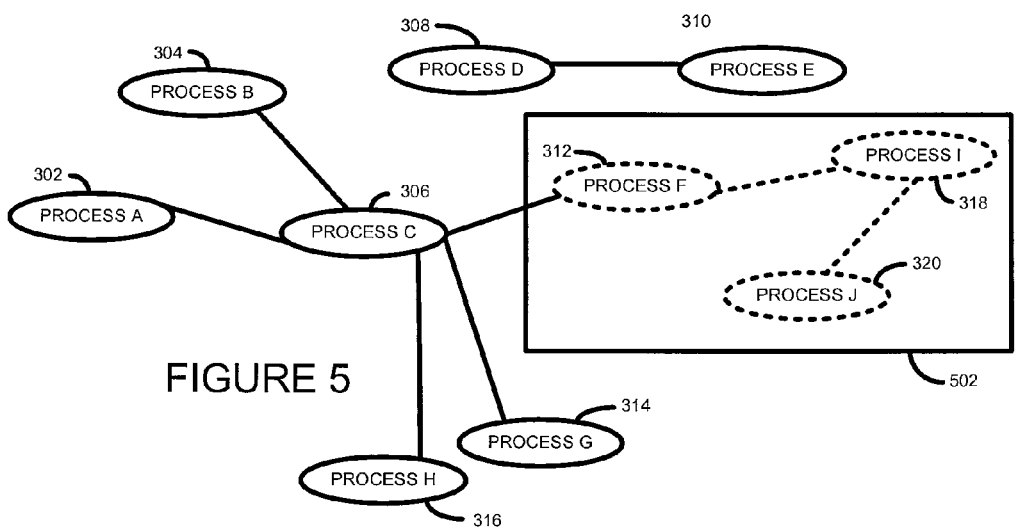
FIG. 5 is a graph diagram of a managed network according to an embodiment of the present invention.

For example, a graphical user interface 122 may be used to visually display (step 812) the built graph of the managed network 102. When an application is identified in the network graph, the different graph elements representing the identified application can be visually indicated to a user of the GUI 112 in a simple manner, as shown, for example in FIG. 5, which shows an identified application 502 comprising the processes 312, 318, and 320.

Figure 6:
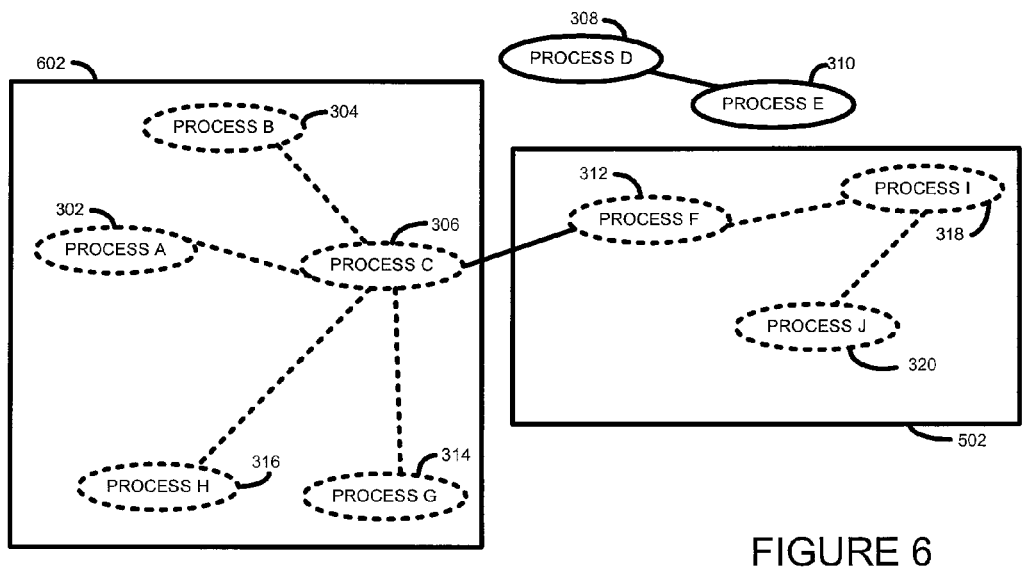
FIG. 6 is a visual representation of a managed network according to an embodiment of the present invention.

FIG. 6 shows a graphical representation of a second application 602 having been identified in a similar manner to that previously described using a suitable template graph and comprising processes 302, 304, 306, 314 and 316.

Figure 7:
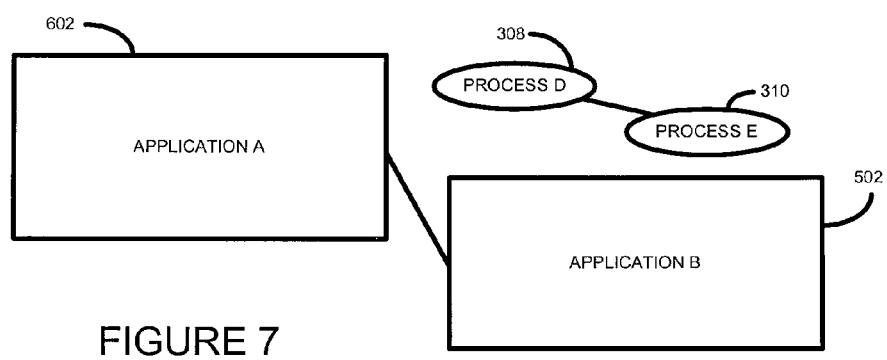
FIG. 7 is a visual representation of a managed network according to an embodiment of the present invention.

FIG. 7 shows a graphical representation of the managed network 102 once the network graph has been searched for all template graphs stored in the template database 118. As shown, in FIG. 6, processes 308 and 310 have not been attributed to any known application.

The above-described template graph matching process can be performed recursively. For example, the identified applications 602 and 502 form their own graph and may thus be searched for the presence of a matching template graph. This enables, for example, identification of higher level structures and dependencies within the managed network 102.

FIG. 7 shows a further representation of the network graph reduced into simple identifiable applications. Any processes that remain unidentified can then be alerted in a suitable manner to, for example, a human operator. In the present example, this is the case for processes 308 and 310 shown in FIG. 6. These unidentified processes could, for example, be part of an unauthorised application in breach of the IT policy of the managed network 102. Alternatively, the unidentified processes could be part of a legitimate application that does not have a corresponding template graph in the template database 118. Again, a human operator alerted to this fact can investigate further. If, for example, the unknown processes are part of a legitimate application the human operator can create a template graph in the template database 118 using the template graph editor/creator 120. Alternatively, remedial action, such as the automatic removal of the unknown processes could be taken.

An advantage of displaying the graphs visually is to enable a human operator to view a visual map of the managed network 102. In this way, rather than a human operator being expected to make sense of a graphical representation of multiple inter-related processes, as shown for example in FIG. 3, groups of processes identified as a known application can be displayed in a clear manner.

Information relating to the identified application may also be used to populate or to update data in a configuration managed database (CMDB) 116. A configuration management database is a repository of information containing information relating to components of a computer system used by numerous IT management tools. A CMDB is also a fundamental component of an information technology infrastructure library (ITIL) framework.

By regularly obtaining information about the managed network 102 and by regularly updating the network graph and identifying template graphs within the network graph enables changes being made to the managed network 102 to be identified. Once identified, the changes can be tracked, monitored and compliance with IT policies can be enforced.

In a further embodiment the above-described techniques can be used to ensure that an installation, upgrade or update to an application in the managed network 102 is correctly carried out. For example, prior to a software upgrade being carried out the managed network is modelled by a graph as described above, and the application to be upgraded is identified by matching an appropriate template graph. After the upgrade is carried out the network graph is updated and a template graph representing the upgraded application is searched for in the graph. If the template graph representing the upgraded application is identified in the network graph this indicates that the upgrade was carried out successfully. If the template graph representing the upgraded application is not identified, this may indicate that the upgrade was unsuccessful and this may be signalled in an appropriate manner, for example to a human operator or support automation system.

Figure 9:
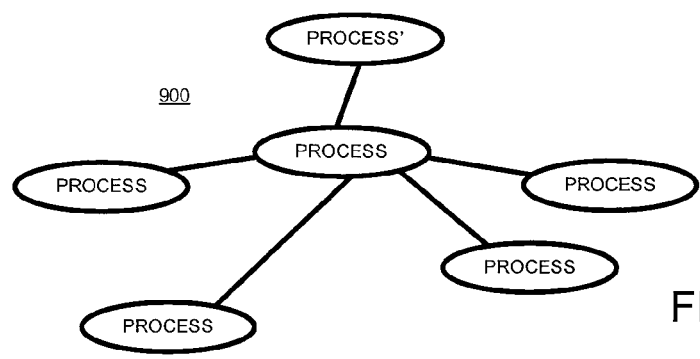
FIG. 9 is a graph diagram of a template graph according to an embodiment of the present invention.

In a yet further embodiment the template graphs stored in the template database 118 include template graphs having a predefined shape configuration that is not necessarily based on or derived from a specific known software application. FIG. 9, for example, shows a general star shaped template graph 900 that, if found in the managed network could be used to indicate an application or collection of processes operating in a probing manner. The template graph 900 does not specify any particular information relating to the kind of processes in the configuration, so effectively enables just the shape of the template graph to be matched. For example, the template graph 900 could represent a pre-determined configuration of parameters. Such a shape or configuration, if found, could represent a legitimate application or collection of processes, but it could also identify an unauthorised application such as a virus, a probe, or the like. Other template graph shapes could also be used as appropriate.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as described above and a machine readable storage storing such a program. Still further, embodiments of the present invention may be conveyed electronically via any medium such as a communication signal carried over a wired or wireless connection and embodiments suitably encompass the same.

The invention claimed is:

1. A method comprising:
building a first graph of at least a part of a computer infrastructure;
determining a presence in the first graph of a first subgraph;
updating one or more components of the computer infrastructure;
rebuilding the first graph of the at least the part of the computer infrastructure; and
determining, using a processor, the presence in the first graph of a second subgraph derived from the updated one or more components and, where the presence of the second subgraph derived from the updated one or more components is not found, signalling that the update failed.

2. The method of claim 1, wherein the first subgraph represents a software application in the computer infrastructure, and determining the presence in the first graph of the first subgraph comprises identifying the software application.

3. The method of claim 2, further comprising maintaining a configuration management database with information relating to the software application.

4. The method of claim 1, wherein the first subgraph represents a configuration of parameters.

5. The method of claim 1, wherein the first graph is built from information including at least one of Internet Protocol address, port number, and port status, discovered from the computer infrastructure using any of probing, agent or packet sniffing techniques.

6. The method of claim 1, further comprising identifying as unidentified applications any part of the first graph not identified as a subgraph.

7. The method of claim 6, further comprising removing any unidentified applications from the computer infrastructure.

8. The method of claim 1, wherein determining the presence in the first graph of the first subgraph comprises performing subgraph isomorphism.

9. A non-transitory machine-readable medium, comprising instructions that, when executed, cause a machine to at least:
build a first graph of at least a part of a computer infrastructure;
determine a presence in the first graph of a first subgraph;
update one or more components of the computer infrastructure;
rebuild the first graph of the at least the part of the computer infrastructure; and
determine the presence in the first graph of a subgraph derived from the updated one or more components and, where the presence of the subgraph derived from the updated one or more components is not found, signal that the update failed.

10. The machine-readable medium of claim 9, wherein the first subgraph represents a software application in the computer infrastructure, and the instructions are to determine the presence in the first graph of the first subgraph by identifying the software application.

11. The machine-readable medium of claim 10, further comprising instructions that, when executed, cause the machine to at least maintain a configuration management database with information relating to the software application.

12. The machine-readable medium of claim 9, wherein the first subgraph represents a configuration of parameters.

13. The machine-readable medium of claim 9, wherein the first graph is built from information including at least one of Internet Protocol address, port number, and port status, discovered from the computer infrastructure using any of probing, agent or packet sniffing techniques.

14. The machine-readable medium of claim 9, further comprising instructions that, when executed, cause the machine to at least identify as unidentified applications any part of the first graph not identified as a subgraph.

15. The machine-readable medium of claim 14, further comprising instructions that, when executed, cause the machine to at least remove any unidentified applications from the computer infrastructure.

16. The machine-readable medium of claim 9, wherein the instructions are to determine the presence in the first graph of the first subgraph by performing subgraph isomorphism.

* * * * *

UNITED STATES PATENT AND TRADEMARK OFFICE
CERTIFICATE OF CORRECTION

| | | Page 1 of 1 |
|---|---|---|
| PATENT NO. | : 8,190,416 B2 | |
| APPLICATION NO. | : 11/873636 | |
| DATED | : May 29, 2012 | |
| INVENTOR(S) | : Michael Mead | |

It is certified that error appears in the above-identified patent and that said Letters Patent is hereby corrected as shown below:

Column 3, line 52: after "(sshd)" insert -- 202 (FIG. 2) --

Column 4, line 2: after "(ssh)" insert -- 204 (FIG. 2) --

Column 4, line 62: after "400" insert -- , including processes 402, 404, and 406, --

Column 6, line 1: after "116" insert -- (Step 814) --

Signed and Sealed this
Twenty-fourth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,190,416 B2  
APPLICATION NO. : 11/873636  
DATED : May 29, 2012  
INVENTOR(S) : Michael Mead Page 1 of 1

It is certified that error appears in the above-identified patent and that said Letters Patent is hereby corrected as shown below:

In column 7, line 39, in Claim 9, delete "medium," and insert -- medium --, therefor.

Signed and Sealed this  
Eighteenth Day of December, 2012

David J. Kappos  
*Director of the United States Patent and Trademark Office*